Sept. 11, 1962 C. I. WASSERMAN 3,053,427
TAPE HANDLING EQUIPMENT
Filed May 14, 1959 2 Sheets-Sheet 1
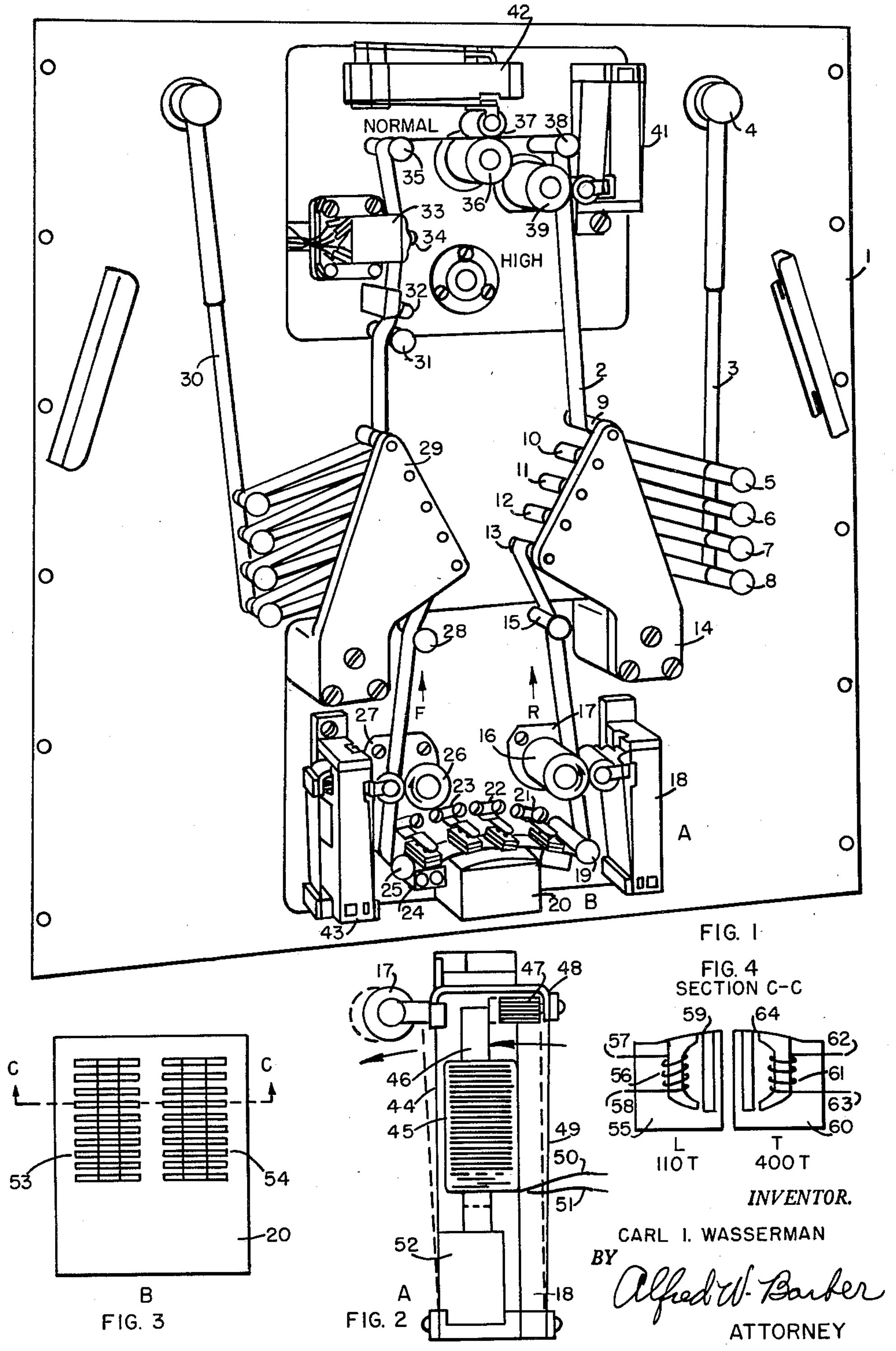
FIG. 1, FIG. 2, FIG. 3, FIG. 4 SECTION C-C
INVENTOR.
CARL I. WASSERMAN
BY Alfred W. Barber
ATTORNEY

TAPE HANDLING EQUIPMENT

Filed May 14, 1959 2 Sheets-Sheet 2

*INVENTOR.*
CARL I. WASSERMAN
BY Alfred W. Barber
ATTORNEY

United States Patent Office 3,053,427

Patented Sept. 11, 1962

3,053,427

TAPE HANDLING EQUIPMENT

Carl I. Wasserman, Queens Village, N.Y., assignor to Potter Instrument Co., Inc., Plainview, N.Y., a corporation of New York Filed May 14, 1959, Ser. No. 813,202

4 Claims. (Cl. 226—118)

The present invention concerns magnetic tape apparatus and, in particular, a tape loop handling and programming device.

A tape loop is a length of magnetic tape with its starting end spliced to its trailing end to form a continuous length of recording tape. One or several recording tracks may be utilized across the width of the tape. In the past, such a tape loop has been utilized for various purposes with the entire loop moving at the same speed past a recording or reading point or head. For, example, such a loop has been used as a storage device in which information is recorded at one point on the loop and read off at another.

According to the present invention it has been found that a tape loop can be utilized in many new ways by providing several driving points, speeds, recording and read out points. In its preferred form a tape loop is provided with two normal forward speed driving points, at least one high speed forward driving point and at least one high speed reverse driving point, two slack loop holding devices, a recording/reading head and a head having two record/reading points. Four magnetically operated clutches are provided, one at each driving point. With this arrangement, many novel modes of operation may be provided a few of which are now outlined. Blocks or bursts of information may be read onto the tape loop continuously or intermittently at one speed and read off continuously or intermittently at another speed. In formation may be recorded on the tape continuously at one speed and this recorded information may be read out intermittently at a much higher speed in blocks. Information continuously recorded on the tape may be formed into blocks and the reverse direction drive may be utilized, for example, to back the tape up to the start of a block where it has been overrun.

Accordingly, one object of the present invention is to provide a tape loop handler capable of a wide variety of programming variations.

Another object is to provide a tape loop handling device capable of receiving informaiton at one rate and feeding the same information out at another rate.

Still another object is to provide a tape loop handling device capable of receiving information continuously and feeding the same information out in block form.

A further object is to provide a tape handler employing two standard speed forward drives, one high speed forward drive and one reverse drive together with one single gap recording/reproducing head and one double gap head.

These and other objects of the present invention will be apparent from the detailed description of the invention taken in connection with the various figures of the drawing.

In the drawing:

FIG. 1 shows a general view of a tape loop handler arranged in accordance with the present invention.

FIG. 2 shows a cross-sectional view of a magnetic drive control suitable for use in the device of the present invention.

FIG. 3 shows a detail of the double gap recording/reproducing head used in the device of the present invention.

FIG. 4 shows a cross-sectional view of the head shown in FIG. 3.

FIGURE 1 shows a tape loop handling device consisting of mounting plate 1 showing various mechanisms to be described for handling tape loop 2.

Figure 6:
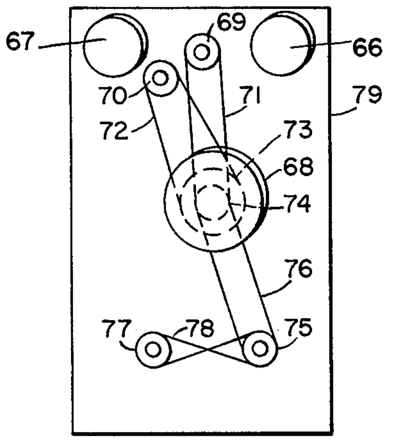
FIG. 6 shows in diagrammatic manner how the rear of the handler of FIG. 1 may appear.

Following tape loop 2 around roller 5, roller 10, roller 6, roller 11, roller 7, roller 12, roller 8 and rollers 13 and 15 it passes on to drive roller 16. Rollers 5, 6, 7 and 8 are carried by slack loop arm 3, pivoted at 4 and actuated by a mechanism to be described in connection with FIGURE 6 of the drawing. After passing over drive roller 16, the tape loop tube passes around roller 19 and across recording and playback heads 20 around roller 25 over drive roll 26 over roller 28 and around various rollers carried by stationary plates 29 and a second slack loop arm 30. From this slack loop position the tape travels over roller 31 across recording/playback head 33 over roller 35 across drive roll 36, roller 38 and over drive roll 39 back to the place where the description started. Rollers 13, 15, 19, 25, 28, 31, 35 and 38 are stationary rollers placed at convenient points for directing the tape loop 2 in the desired direction. Four driving rollers are shown 16, 26, 36 and 39. Each one of these driving rollers is associated with an electromagnetic clutch device which is shown in detail in FIGURE 2. When the magnetic clutch device assomciated with the driving roller is actuated the tape is moved in accordance with the direction of and speed of the associated driving roller. Driving roller 16 has associated with it clutch roller 17 and electromagnetic clutch mechanism 18. Driving roller 26 has associated with it clutch roller 27 and clutch mechanism 43. Driving roller 36 has associated with it clutch roller 37 and electromagnetic clutch mechanism 42. Driving roller 39 has associated with it clutch roller 40 and electromagnetic clutch mechanism 41. For the sake of clarifying the description normal direction of travel of the tape may be assumed to be in a clockwise direction so that driving roller 26 when rotated in the direction shown by the arrow will drive the tape in its normal forward direction as designated by the letter F. Similarly driving roller 16 when rotated in the direction shown by the arrow will drive the tape in the reverse direction as designated by the letter R. Driving rollers 36 and 39 will be operated in a normal forward direction and for purposes of illustration driving roller 36 may be operated at normal speed while driving roller 39 may be operated at an arbitrarily high speed to give fast travel of the tape. One of the features of the present invention is the utilization of these four driving rollers according to various programming schemes to accomplish various objectives to be set forth below. To complete the essential elements of the tape handler there is a combination recording and playback head 20 and a second head 33. Recording/playback head 33 may be a so-called single head while recording/playback head 20 may be a dual head to be set forth below. Associated with head 20 are four pressure pads designated as 21, 22, 23 and 24 which are used to keep the tape in intimate contact with the head as it passes over it. Associated with head 33 is pressure pad 34. The special dual head 20 is shown in more detail in FIGURES 3 and 4. For purposes of illustration head 33 may be considered the recording head and drive roller 36 the driving roller for recording purposes. In the same way dual head 20 may be considered the playback head and driving roller 26 the driving roller utilized for playback purposes. The positions of slack loop arms 3 and 30 may be controlled by servomechanisms in order to maintain fast impression on the tape loop in a manner well-known to those in the art.

It will be apparent that where the combination of forward and reverse drives, normal and high speed drives, slack loops recording head and dual recording/playback head that many different modes of operation may be accomplished. For example, intermittent input feed may be accomplished to accommodate information being received intermittently by driving feed drive roll 36 intermittently in accordance with the reception of input information and recording this information upon the tape by means of recording head 33. This recorded information may then be sent out continuously by driving drive roll 26 continuously and taking off the information by means of playback head 20. The reverse operation may be accomplished by driving feed roll 36 continuously and readout or playback roll 26 intermittently. Another mode of operation is to accomplish a change in speed in which information may be received at a high rate of speed through the use of drive roll 39 and readout at a normal rate of speed by means of drive roll 26 and playback head 20. Also continuously received information recorded by recording at 33 may be formed into blocks by the intermittent operation of playback drive roll 26. In this mode of operation the dual function of head 20 is obvious. In order to form information into blocks drive roll 26 is operated for intervals of time to form blocks of information. However, the formation of the block is not terminated as long as a bit of information is coming through the playback head 20. This presence of information at the end of a block is detected by the second head in dual head 20 and may be utilized in a lockout circuit to prevent the stopping of the blocking operation until the information has been completed.

FIGURE 2 shows details of the drive roll electromagnetic clutching device which may be utilized as shown in conjunction with each of the driving rollers. The clutching operation is performed by moving a pinch roll 17 toward a drive roller and sequeezing the tape loop therebetween. Roller 17 is mounted on a spring member 44 which normally keeps the roller out of contact with a driving roller. Roller 17 is linked by means of a yoke 48 to an electromagnetic armature 47. This armature 47 is in a position with the respect to electromagnetic coil 46 so that when electromagnetic coil 45 is energized over leads 50 and 51 the two are pulled together thereby moving clutch roller 17 into the position shown by the dotted line. The mounting of roller 17 is completed by second spring member 49 which passes between yoke 48 and the main frame number 18. Steel block 52 serves to hold electromagnetic armature 46 to frame 18. This electromagnetic clutch device is rugged, can exert considerable pressure against the driver roll and is capable of extremely fast operation.

FIGURE 3 shows a top view of dual recording/playback head 20 showing the dual row of recording/playback head gaps fifty-three and fifty-four. FIGURE 4 shows a cross-sectional detail taken on line C—C of FIGURE 3. FIGURE 4 thus shows the coil and gap construction of one of the multiple track dual head combinations of head 20. One head consists in coil 56 connected over lead 57 and 58, magnetic coil structure 55 and recording of playback gap 59. The other head consists of electromagnetic coil 61 connected over lead 62 and 63, magnetic coil 60 and recording/playback gap 64. These two heads are alined so that they both operate on the same track on the magnetic tape.

Figure 5:
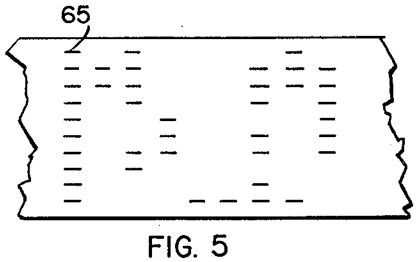
FIG. 5 shows a diagram illustrating magnetic recordings made with the device of the present invention.

FIGURE 5 shows a small section of magnetic tape in which the magnetic recorded bits although actually invisible are represented by small dashes. Across the tape it will be observed that there are ten tracks 65. Actually the number of tracks could be any convenient number such as eight, sixteen, thirty-two, or even sixty-four.

FIGURE 6 shows a back view of the drive mechanism which may be utilized for the device shown in FIGURE 1. Mounting plate 79 corresponding to mounting plate 1 of FIGURE 1 carries two servo devices 66 and 67 controlling arms 3 and 30 respectively in FIGURE 1. A driving motor 68 has a small pulley 74 which drives both 71 and 76 and pulleys 69 and 75 respectively. Pulley 69 is connected to drive roll 36 of FIGURE 1 and pulley 75 is connected to drive roll 26 of FIGURE 1, so that these drive rolls are driven at normal speeds in a forward direction. From pulley 75 a belt 76 which is crossed to reverse direction of rotation drives pulley 77 which in turn drives drive roll 16 of FIGURE 1, in reverse direction. A larger pulley 73 driven by motor 68 drives belt 72 and in turn pulley 70 at high speed which drives high speed pulley 39 of FIGURE 1.

Figure 7:
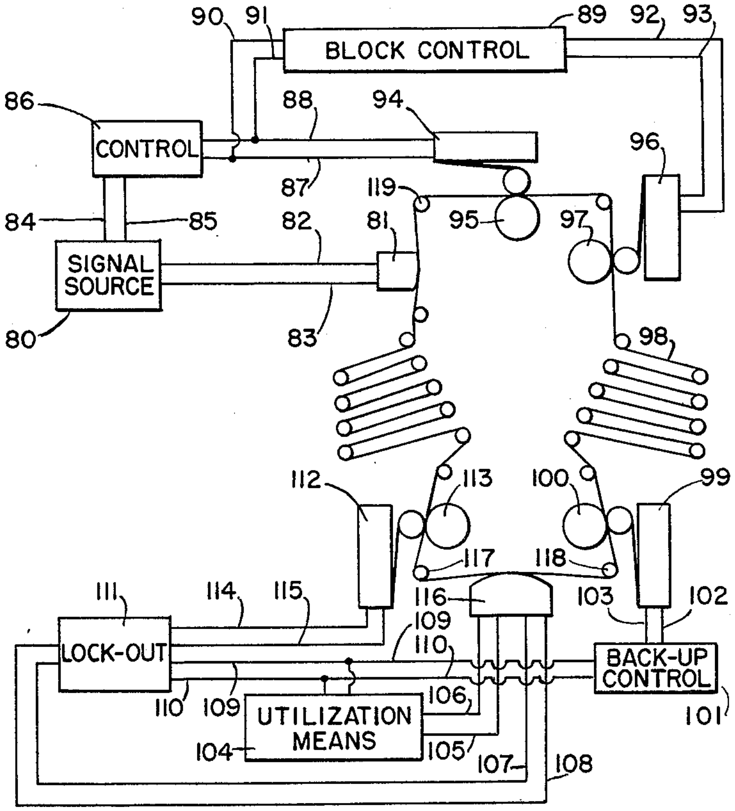
FIG. 7 is a block diagram of one possible system incorporating the present invention.

FIGURE 7 shows in block diagram one manner in which the system of FIGURE 1 may be programmed. Driving rollers 95, 97, 100 and 113 are shown with the electromagnetic clutches 94, 96, 99 and 112, corresponding with drive rollers 36, 39, 16, 26, and electromagnetic clutches 42, 41, 18 and 43 of FIGURE 1. Recording/playback head 81 corresponds to recording/playback head 33 of FIGURE 1. Dual recording/playback head 116 corresponds with the dual head 20 of FIGURE 1. One mode of operation is shown in FIGURE 7 where a source of signals to be programmed is derived from source 80 which is connected over leads 82 and 83 to the recording/playback head 21 in order to record signals on tape 98 which corresponds to tape 2 of FIGURE 1. These signals to be recorded are also utilized in control device 86 over leads 84 and 85. Control 86 is connected to clutch 94 over leads 87 and 88 so that when signals are given, clutch 94 is engaged causing drive roller 95 to advance the tape at normal speed. Signals from control 86 are also placed on block control 89 over leads 90 and 91 and the output of block control 89 is utilized in clutch 96 over leads 92 and 93. Block control 89 may contain a timing mechanism which periodically produces a signal over leads 92 and 93 to engaged clutch 96 and advance the tape suddenly by means of high speed drive roll 97 in order to form a short space after each block of recorded information. The information thus recorded on the tape in block form may be taken off to utilization means 104 over leads 105 and 106 from the playback head portion of dual head 116. Block out control 111 energizes driving roll clutch 112 over leads 114 and 115. Block out control 111, also controls back up control 101 over leads 109 and 110, and back up control 101 energizes clutch 99 over leads 102 and 103. Signals from the second head of dual heads 116 received over leads 107 and 108 at block out 111 may be utilized to prevent overrunning or stopping of the drive while information is still to be recorded or to back up the device to start a new block.

While only one form, with modifications, of the present invention has been shown and described, many variations will be apparent to those skilled in the art within the spirit and scope of the invention as set forth in particular in the appended claims.

What is claimed is:

1. In a digital information tape recording and playback system, the combination of, a first record/play-back head, two independent tape drive means adjacent to said head one of which operates at a speed high compared to the speed of the other drive means, a second record/play-back head, a third tape drive means adjacent to the second head for forward drive of said tape and a fourth tape drive means adjacent to the second head for reverse drive of said tape and two tape storage means one on each side between said heads.

2. In a digital information tape recording and playback system as set forth in claim 1 wherein at least one of the tape storage means includes a multiple loop tension arm mechanism.

3. In a digital information tape recording and playback system as set forth in claim 1 wherein the path from said first head through one of said two tape storage means to said second head is substantially equal to the path from said second head through the other of said two tape storage means to said first head.

4. In a digital information tape recording and playback system, the combination of, a first transducer means, two tape drive means adjacent said first transducer means one of which operates at a speed high compared to the speed of the other drive means, a second transducer means, a forward tape drive means adjacent said second transducer means for forward drive of a tape, a reverse tape drive means adjacent said second transducer means for reverse drive of a tape, two tape storage means one on each side of said transducer means, and the path from said first transducer means through one of said two tape storage means to said second transducer means is substantially equal to the path from said second transducer means through the other of said two tape storage means to said first transducer means.

References Cited in the file of this patent

UNITED STATES PATENTS

| | | |
|---|---|---|
| 2,637,560 | Smith | May 5, 1953 |
| 2,831,678 | MacNeill | Apr. 22, 1958 |
| 2,864,610 | Textrom | Dec. 16, 1958 |
| 2,865,639 | Gillette et al. | Dec. 23, 1958 |
| 2,904,275 | Selsted et al. | Sept. 15, 1959 |
| 2,908,767 | Fritzinger | Oct. 13, 1959 |

FOREIGN PATENTS

| | | |
|---|---|---|
| 685,032 | Great Britain | Dec. 31, 1952 |